United States Patent [19]
Kummer

[11] 3,973,309
[45] Aug. 10, 1976

[54] CLAMPING TOOL HOLDER FOR REVERSIBLE CUTTING ELEMENT

[76] Inventor: Pierre Kummer, Rue des Pres 20, 2720 Tramelan (Canton of Berne), Switzerland

[22] Filed: July 2, 1975

[21] Appl. No.: 592,379

[52] U.S. Cl. .................................................. 29/96
[51] Int. Cl.² ........................................ B26D 1/00
[58] Field of Search ....................................... 29/96

[56] References Cited
UNITED STATES PATENTS

| | | | |
|---|---|---|---|
| 3,280,450 | 10/1966 | Sirola | 29/96 |
| 3,314,126 | 4/1967 | Stier | 29/96 |
| 3,906,602 | 9/1975 | Kummer | 29/96 |

Primary Examiner—Leonidas Vlachos
Attorney, Agent, or Firm—Marshall & Yeasting

[57] ABSTRACT

A shank has a support surface for an apertured reversible cutting element and has a hole opening into the support surface at an acute angle. A clamping stud has a clamping head which is engageable in the aperture of the cutting element and has a shaft which is displaceably guided in the hole in the support surface. A control screw is adjustably mounted in the shank beside the shaft of the clamping stud, in operative engagement with the shaft. An annular groove on the surface of the control screw is engaged by the single tooth formed in the shaft of the clamping stud by two milled recesses. The control screw has smooth-walled cylindrical peripheral surface portions on both sides of said groove which are in engagement with the bottom surfaces of said recesses.

3 Claims, 4 Drawing Figures

CLAMPING TOOL HOLDER FOR REVERSIBLE CUTTING ELEMENT

BACKGROUND OF THE INVENTION

When a clamping stud having a clamping head which is engageable in the aperture of an apertured cutting element is used to secure the cutting element to a shank having a support surface for the cutting element in which is provided a hole to receive the shaft of the clamping stud, it is important that the clamping stud be securely locked in the shank so that it cannot be gradually loosened by forces acting in various directions which are produced by chattering of the cutting element during a cutting operation.

The shaft of a clamping stud can be locked securely in the hole provided in the shank of a tool holder by the use of a locking screw having teeth which engage with teeth provided on the shaft of the clamping stud, if the force exerted by the teeth on the locking screw acts in a direction which is non-parallel to the axis of the shaft, so as to produce a wedging driving action upon the shaft.

It has now been found that such a locking screw, although it locks the clamping stud securely in place so that the clamping stud does not become loosened by chattering of the cutting element, is subject to a new difficulty in that such a locking screw, when tightened sufficiently to secure the clamping stud firmly in place, is liable to jam the mechanism so that it is difficult or impossible to remove the locking screw.

SUMMARY OF THE INVENTION

The present invention is based upon the discovery that the shaft of a clamping stud can be securely locked in a hole provided in a shank by means of a control screw engaging the side of the clamping stud without jamming, if the control screw has an annular groove which is engaged by a single tooth formed in the shaft of the clamping stud by two milled recesses, and has smooth-walled surface portions on both sides of the groove which are in engagement with the bottom surfaces of the recesses.

It is believed that when the parts are so constructed, in accordance with the invention, the elimination of any tendency for the mechanism to become jammed is due to the fact that the engagement of cylindrical peripheral portions of the control screw with the bottom surfaces of the recesses prevents appreciable twisting of the clamping stud.

DESCRIPTION OF THE PREFERRED EMBODIMENT

Figure 1:
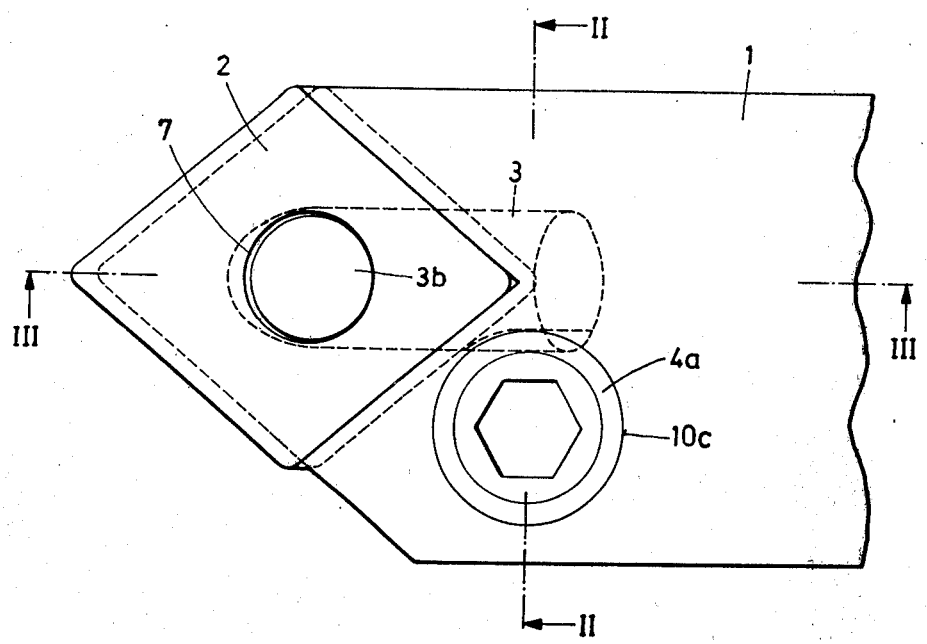
FIG. 1 is a top plan view of a clamping tool holder embodying the invention.
Figure 2:
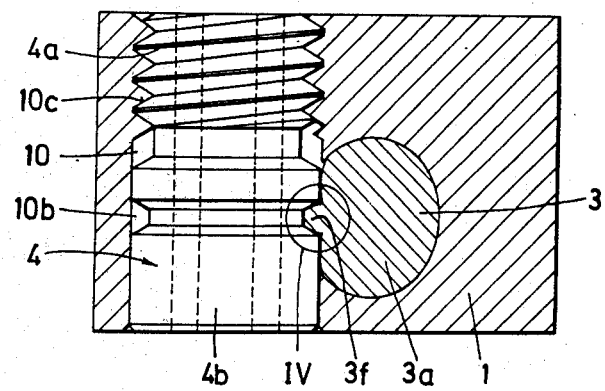
FIG. 2 is a section taken on the line II—II of FIG. 1.

The reversible cutting element 2 to be clamped in place is seated in a depression in the shank 1 and has a central aperture 7, in which a head 3b of a clamping stud 3 engages. The shaft 3a of the clamping stud 3 is longitudinally displaceable, practically free from lateral play, in a blind hole 8 in the shank 1 which is at an acute angle to the surface 5 supporting the cutting element 2. The shank 1 has a vertical bore 10 situated beside the blind hole 8, and the narrowed upper section of the bore has internal threads 10c. Engaged with these threads is the threaded upper portion 4a, of a control screw 4, the lower, smooth-walled-cylindrical portion 4b of which is rotatable and displaceable, practically free from play, in the corresponding section 10b of the bore 10. This portion 4b of the control screw is in toothed engagement with the portion of the clamping-stud shaft 3a situated beside it, in such a way that longitudinal movement of the control screw 4 in one or the other direction results in corresponding longitudinal movement of the clamping stud 3, and thereby results in the clamping in place or releasing of the cutting element 2.

Figure 3:
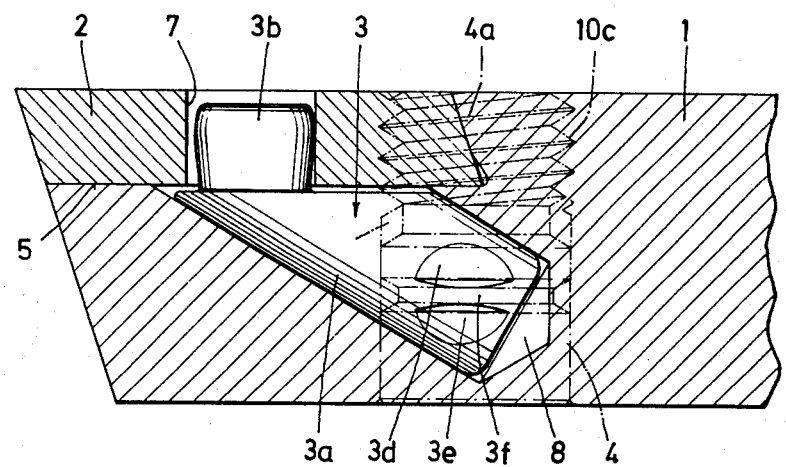
FIG. 3 is a longitudinal section along the line III—III of FIG. 1.
Figure 4:
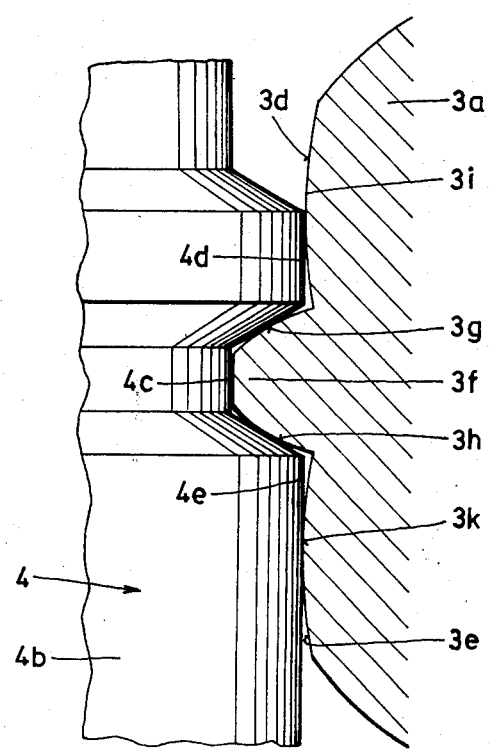
FIG. 4 is an enlarged view of the portion of FIG. 2 indicated by a circle.

In the clamping-stud shaft 3a, a single tooth 3f is formed by two milled recesses 3d and 3e, which are parallel to one another but at an angle to the axis of the clamping-stud shaft, and on the other hand—viewed in FIG. 3—at right angles to a radial plane of the control screw 4. The tooth 3f engages tangentially—and practically free from play—in an annular groove 4c which is trapezoidal in longitudinal profile and which is cut into the otherwise smooth-walled-cylindrical portion 4b of the control screw 4. As shown in a greatly exaggerated manner in FIG. 4, the flanks 3g, 3h of the tooth 3f have a slight camber; likewise, the bottom surfaces 3i, 3k of the milled recesses 3d, 3e, respectively, situated beside these flanks, also have a slight camber in the same plane. When the diameter of the clamping-stud shaft 3a equals 6mm. and the outside diameter of the control screw 4 equals 8mm., the height of these cambers may be 0.016 mm., for example.

Upon operation of the control screw 4, there results besides the already mentioned—intended—displacement of the clamping stud 3, a torque effect upon the clamping stud 3 as well; however, the stud is supported—according to the direction of operation—with one or the other of the bottom surfaces 3i, 3k of the milled recesses upon the adjoining smooth-walled-cylindrical peripheral surface portion 4d or 4e respectively, of the control screw 4; all of these contacts are—thanks to the aforementioned cambers—surface contacts; no edge contacts can occur. Thus the clamping stud 3—as the practical results clearly prove—is effectively supported so as to prevent appreciable twisting of the stud; and the danger of jamming is effectively eliminated.

I claim:

1. A clamping tool holder for a plate-shaped, apertured reversible cutting element, comprising a shank with a support surface for the cutting element and a bore opening into the support surface at an acute angle, a clamping stud having a clamping head which is engageable in the aperture of the cutting element and having a shaft which has an axially slidable fit in said bore, and further comprising a control screw which is adjustably mounted in the shank in a position offset laterally of the shank from the shaft of the clamping stud, in operative engagement with the said shaft, wherein the improvement comprises an annular groove on the surface of the control screw, and a single tooth, extending at right angles to a plane passing through the axis of the control screw and at an acute angle to planes passing through the axis of the shaft of the clamping stud, which is engaged in said groove and is formed in the shaft of the clamping stud by two milled shoulders, said control screw having smooth-walled-cylindrical peripheral surface portions on both sides of said groove which are in engagement with said shoulders, thereby preventing appreciable twisting of the shaft of the clamping stud by bracing said shaft against said cylindrical peripheral portions.

2. A tool holder according to claim 1, wherein the flanks of the tooth are slightly cambered and the surfaces of the milled shoulders on the shaft are slightly cambered in a common plane.

3. A tool holder according to claim 2, wherein the height of the cambers is about 0.016 mm.

* * * * *